United States Patent
Jekimow et al.

(10) Patent No.: US 11,885,542 B2
(45) Date of Patent: Jan. 30, 2024

(54) EXPANSION VALVE

(71) Applicant: Siemens Schweiz AG, Zürich (CH)

(72) Inventors: Alexander Jekimow, Gundelfingen (DE); Karl-Heinz Petry, Reichenburg (CH); Pascal Ernstberger, Rastatt (DE); Rolf Kunzmann, Gernsbach (DE)

(73) Assignee: SIEMENS SCHWEIZ AG, Zurich (CH)

( * ) Notice: Subject to any disclaimer, the term of this patent is extended or adjusted under 35 U.S.C. 154(b) by 238 days.

(21) Appl. No.: 17/127,206

(22) Filed: Dec. 18, 2020

(65) Prior Publication Data

US 2021/0190397 A1    Jun. 24, 2021

(30) Foreign Application Priority Data

Dec. 20, 2019   (EP) ..................................... 19218717

(51) Int. Cl.
    *F25B 41/345*    (2021.01)

(52) U.S. Cl.
    CPC .................................. *F25B 41/345* (2021.01)

(58) Field of Classification Search
    CPC ....................................................... F25B 41/345
    See application file for complete search history.

(56) References Cited

U.S. PATENT DOCUMENTS

| | | | |
|---|---|---|---|
| 2,390,425 A * | 12/1945 | Crum | F01P 7/12 137/340 |
| 2,491,905 A * | 12/1949 | Ray | F25B 41/34 137/262 |
| 4,810,985 A * | 3/1989 | Mesenich | F02M 51/0682 335/279 |
| 6,116,570 A | 9/2000 | Bulgatz et al. | 251/129.1 |
| 6,390,782 B1 | 5/2002 | Booth | 417/53 |
| 6,460,567 B1 | 10/2002 | Hansen, III | 137/554 |
| 8,567,444 B2 | 10/2013 | Marin et al. | 138/31 |
| 10,273,868 B2 | 4/2019 | Komuro | |
| 10,451,048 B2 | 10/2019 | Domke | F04B 27/18 |
| 2005/0189509 A1 | 9/2005 | Peric | 251/129.15 |

(Continued)

FOREIGN PATENT DOCUMENTS

| | | | | |
|---|---|---|---|---|
| BR | 102013032835 A2 | 2/2016 | | F16K 1/34 |
| CA | 1241251 A | 8/1988 | | F16K 11/04 |
| CN | 1922424 A | 2/2007 | | F16K 1/34 |

(Continued)

OTHER PUBLICATIONS

Search Report for EP Application No. 19218717.7, 7 pages, dated Feb. 20, 2020.

*Primary Examiner* — Eric Keasel

(74) *Attorney, Agent, or Firm* — Slayden Grubert Beard PLLC

(57) ABSTRACT

Various embodiments of the teachings herein include a valve comprising: a first port; a second port; a fluid path extending between the first port and the second port; a valve member situated in the fluid path, the valve member selectively moveable between a closed position, blocking the fluid path, and an open position; an armature coupled to the valve member and having a surface; and a solenoid forming a linear actuator with the armature. At least a portion of the surface of the armature directly faces the solenoid.

10 Claims, 10 Drawing Sheets

(56) References Cited

U.S. PATENT DOCUMENTS

| | | | |
|---|---|---|---|
| 2013/0098071 A1 | 4/2013 | Means et al. | 62/56 |
| 2014/0339449 A1 | 11/2014 | Del Frate | 251/129.15 |

FOREIGN PATENT DOCUMENTS

| | | | |
|---|---|---|---|
| CN | 101358654 A | 2/2009 | F16K 1/00 |
| CN | 102442193 A | 5/2012 | B60K 6/12 |
| CN | 102644799 A | 8/2012 | F16K 31/06 |
| CN | 103062964 A | 4/2013 | F25B 41/06 |
| CN | 103291999 A | 9/2013 | F16K 1/00 |
| CN | 103764995 A | 4/2014 | F02M 51/06 |
| CN | 104567138 A | 4/2015 | F25B 41/06 |
| CN | 107575621 A | 1/2018 | F16K 31/06 |
| CN | 207394082 U | 5/2018 | F16K 31/06 |
| DE | 100 58 441 | 5/2001 | F16K 31/04 |
| DE | 10 2014 218 525 | 3/2016 | F04B 27/16 |
| EP | 0 102 076 | 3/1984 | F16K 1/34 |
| EP | 3 064 811 | 9/2016 | F16K 3/22 |
| JP | S59180178 A | 10/1984 | F16K 31/06 |
| WO | 2018/067229 A1 | 4/2018 | F16K 27/02 |

\* cited by examiner

EXPANSION VALVE

CROSS-REFERENCE TO RELATED APPLICATIONS

This application claims priority to EP Application No. 19218717.7 filed Dec. 20, 2019, the contents of which are hereby incorporated by reference in their entirety.

TECHNICAL FIELD

The present disclosure relates to valves. Various embodiments of the teachings herein include electric and/or electronic expansion valves. An example expansion valve incorporating teachings of the instant disclosure may be employed in an apparatus or system for heating, refrigeration, and/or air-conditioning.

BACKGROUND

Systems for heating, cooling, refrigeration, ventilation, and/or air-conditioning commonly harness a vapor-compression refrigeration circuit. The circuit has a compressor, a condenser, an expansion valve, and an evaporator. An expansion valve is often arranged in between the condenser and the evaporator. The expansion valve in such an arrangement controls an amount of refrigerant released into the evaporator.

A German patent application DE102014218525A1 describes an electronic control valve for an air conditioning compressor. FIG. 1 of the patent application shows a control valve 100 having a solenoid 102. The solenoid envelopes an armature, the armature being connected to a stem 106. A pair of leads connects to the solenoid 102 and supplies the solenoid 102 with an electric current. The solenoid 102 and the armature seem to be arranged in a sealed enclosure.

A German patent application DE10058441A1 describes a motor driven valve provided with a brushless servomotor having a rotor inside a magnetically transparent casing. The motor driven valve of DE10058441A1 is also provided with a stator located outside the casing and comprising drive coils and Hall effect units. DE10058441A1 teaches in column 1, lines 57 to 64, that certain valve applications that require only low torque employ stepper motors to inhibit leakage. The stepper motors are entirely mounted within the valve housing. A rod, a seal as well as an associated leak potential are thereby eliminated. This, however, exposes the rotor, the windings, and the associated wiring to liquids.

A U.S. Pat. No. 6,390,782B1 describes a control valve for a variable displacement compressor. FIG. 8b thereof shows a reference gas chamber 90 of a control valve. A housing is shown with a solenoid actuator 92 and a leaf spring 178 arranged inside the housing. An electric current is applied to the solenoid actuator 92 via a pair of leads 87. An armature appears to be arranged in the centre of the housing. The armature connects to a stem 177 acting on a valve member 170, 172.

SUMMARY

The present disclosure describes an expansion valve that affords effective cooling of the windings of the valve. The electronic expansion valve according to the instant disclosure also is compact. In some embodiments, a valve comprises a solenoid, an armature, a stem, a resilient member, and a valve member all arranged in the same enclosure. A stem couples the linear actuator and the valve member.

For example, some embodiments of the teachings herein include a valve (1) comprising: a first port (3), a second port (4), and a fluid path extending between the first port (3) and the second port (4); a valve member (5a; 5b) situated in the fluid path between the first port (3) and the second port (4), the valve member (5a; 5b) being selectively moveable between a closed position, which closes the fluid path between the first port (3) and the second port (4), and an open position, which opens the fluid path between the first port (3) and the second port (4); an armature (7a; 7b) coupled to the valve member (5a; 5b) and having a surface; and a solenoid (9a, 9b; 9c), the solenoid (9a, 9b; 9c) and the armature (7a; 7b) forming a linear actuator. A portion of the surface of the armature (7a; 7b) directly faces the solenoid (9a, 9b; 9c).

In some embodiments, the surface of the armature (7a) is an outer surface; and a portion of the outer surface of the armature (7a) directly faces the solenoid (9a, 9b).

In some embodiments, the surface of the armature (7b) defines a slot in the armature (7b); and the slot receives the solenoid such that the surface envelopes and directly faces the solenoid (9c).

In some embodiments, the valve (1) comprises a housing (2); and the solenoid (9a, 9b; 9c), the armature (7a; 7b), and the valve member (5a; 5b) are situated inside the housing (2).

In some embodiments, the housing (2) comprises a first chamber (10a); the solenoid (9a, 9b; 9c) is situated inside the first chamber (10a); the armature (7a; 7b) has a first portion; and the first portion of the armature (7a; 7b) is situated inside the first chamber (10a).

In some embodiments, the first chamber (10a) comprises an inner surface; the valve (1) comprises a resilient member (11a-11e); the resilient member (11a-11e) mechanically connects to the inner surface of the first chamber (10a); the resilient member (11a-11e) mechanically connects to the armature (7a; 7b); and the resilient member (11a-11e) urges the armature (7a; 7b) and the valve member (5a; 5b) toward the closed position of the valve (1).

In some embodiments, the first chamber (10a) is filled with a refrigerant; and the solenoid (9a, 9b; 9c) and the first portion of the armature (7a; 7b) are directly exposed to the refrigerant.

In some embodiments, the solenoid (9a, 9b; 9c) comprises a plurality of coils; and at least one coil of the plurality of coils is directly exposed to the refrigerant.

In some embodiments, the housing (2) comprises a second chamber (10b); wherein the valve member (5a; 5b) is situated inside the second chamber (10b); the second chamber (10b) comprises an outer wall; and the first port (3) and the second port (4) pass through the outer wall of the second chamber (10b).

In some embodiments, the valve (1) comprises a partition wall in between the first chamber (10a) and the second chamber (10b); wherein the partition wall comprises an orifice (13) such that the first chamber (10a) is in fluid communication with the second chamber (10b).

In some embodiments, the valve (1) comprises a guide member (14a-14d); and the guide member (14a-14d) restricts movements of the armature (7a; 7b) to linear movements of the armature (7a; 7b).

In some embodiments, the guide member (14a, 14b) comprises a sleeve mounted to the partition wall; and the guide member (14a, 14b) forms a slide bearing.

In some embodiments, the armature (7a; 7b) mechanically connects to the valve member (5a; 5b); and a linear movement of the armature (7a; 7b) causes a linear movement of the valve member (5a; 5b).

In some embodiments, the armature (7a; 7b) and the valve member (5a; 5b) are arranged along one straight line.

In some embodiments, the valve (1) comprises a third port; wherein the third port perforates the second chamber (10b); and the third port perforates the housing (2).

BRIEF DESCRIPTION OF THE DRAWINGS

Various features are apparent to those skilled in the art from the following detailed description of the disclosed non-limiting embodiments. The drawings that accompany the detailed description can be briefly described as follows.

DETAILED DESCRIPTION

The valves described herein leverage the relatively moderate requirements of electronic expansion valves in terms of torque and/or force. Yet, the actuator of an electronic expansion valve shall achieve high speeds such that the valve may quickly respond to critical conditions. The actuator may be a linear actuator formed by the solenoid and the armature. The linear actuator is self-contained and minimizes numbers of moving parts. Further, the linear actuator exhibits similar behaviors extending and retracting.

No magnetically transparent can is arranged in between the solenoid and the armature. The solenoid is arranged just outside or inside the armature, thereby minimizing any magnetic gap between the solenoid and the armature. Also, a missing magnetic can affords a compact valve. In addition, no member arranged in between the solenoid and the armature adversely impacts on a magnetic flux between the solenoid and the armature. The absence of a can allows the position of the valve to be precisely controlled by an electric current through the solenoid.

The valve also inhibits overheating of components of the valve. More specially, any overheating of the solenoid is inhibited. To that end, at least a portion of the solenoid is in direct contact with a refrigerant flowing through the valve. In an embodiment, the solenoid comprises a plurality of coils and each coil of the solenoid is directly exposed to the refrigerant flowing through the valve. In another embodiment, at least one coil of the solenoid is directly exposed to the refrigerant flowing through the valve. In some embodiments, the expansion valve is suitable for vapour-refrigeration circuits.

In some embodiments, there is a resilient member that provides a maximum urge for the valve member to return to its normally closed position. To that end, the resilient member may comprise a leaf spring and/or a plate spring. The valve immediately and directly returns to a normally closed position in the event of a power failure. In some embodiments, the valve is also suitable to be used as a safety valve.

In some embodiments, the valve is for the modulating control of a fluid flowing through the valve.

In some embodiments, the valve has a structure to inhibit mechanical wear. To that end, the resilient member of the normally closed valve described herein comprises a permanent magnet such as a ferromagnet. Where minimum mechanical wear and maximum safety are both desired, the permanent magnet may comprise a neodymium magnet. In some embodiments, the neodymium magnet comprises a NdFeB magnet selected from at least one of a: sintered $Nd_2Fe_{14}B$ magnet, or a bonded $Nd_2Fe_{14}B$ magnet.

In some embodiments, the permanent magnet comprises a samarium-cobalt SmCo magnet selected from at least one of a: sintered $SmCo_5$ magnet, or a sintered $Sm(Co, Fe, Cu, Zr)_7$ magnet.

Figure 1:
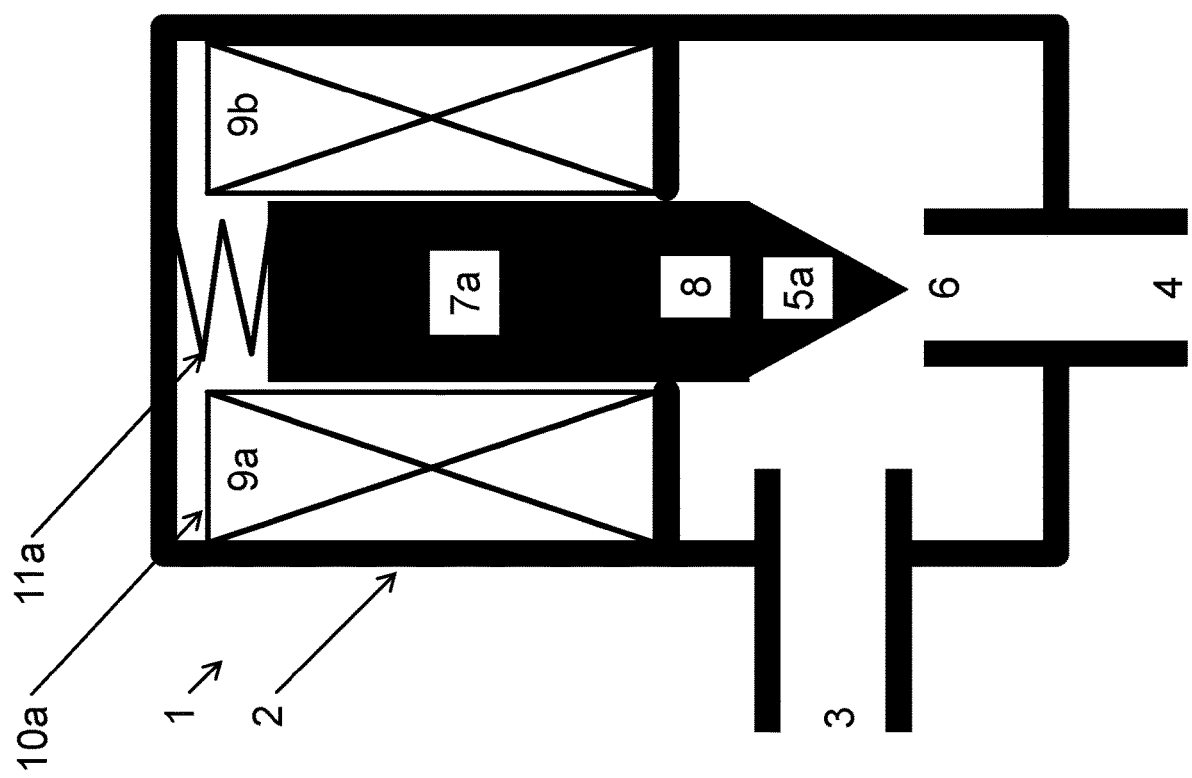
FIG. 1 is a schematic of a valve incorporating teachings of the present disclosure.

FIG. 1 shows the various components of an example valve 1 incorporating teachings of the instant disclosure. The valve 1 may comprise an expansion valve. In some embodiments, the valve 1 is or comprises an electronic expansion valve. The valve 1 may be installed in a refrigeration-vapour circuit. The valve 1 may be part of a refrigeration-vapour circuit.

The valve 1 comprises a housing 2. The valve housing 2 has sides defining a first port 3 and a second port 4. In an embodiment, the first port 3 comprises a first conduit. It is also envisaged that the second port 4 comprises a second conduit. According to an aspect of the instant disclosure, the first port 3 is an inlet port and the second port 4 is an outlet port 4. According to another aspect of the instant disclosure, the first port 3 is an outlet port and the second port 4 is an inlet port.

The first port 3 and the second port 4 are in fluid communication with each other to afford flow of a fluid through the valve 1. In a preferred embodiment, the fluid comprises a refrigerant. The fluid may, by way of non-limiting example, be a R32, R401A, R404A, R406A, R407A, R407C, R408A, R409A, R410A, R438A, R500, or a R502 refrigerant. The fluid at the inlet port may be a liquid. The fluid at the outlet port may be a two-phase fluid.

A fluid path extends between the first port 3 and the second port 4. A valve member 5a is situated in the fluid path. The valve member 5a is moveable. The valve member 5a cooperates with a valve seat 6. The valve member 5a thereby varies and limits a flow rate of the fluid through the valve 1.

In some embodiments, a valve body is or comprises the housing 2. In some embodiments, the housing 2 comprises a metallic material such as steel, especially austenitic (stainless) steel and/or ferrite steel. In some embodiments, the housing 2 comprises aluminum (alloy) or gunmetal or brass. In some embodiments, the housing 2 comprises a polymeric material. In some embodiments, the housing 2 is manufactured using an additive manufacturing technique such as three-dimensional printing. Manufacture of the housing 2 may involve selective laser sintering. It is still envisaged that the housing 2 comprises a grey cast material and/or of nodular cast iron.

In some embodiments, a fluid conduit in between the first port 3 and the second port 4 is or comprises a polymeric member. In some embodiments, manufacture of the fluid conduit and/or of the first port 3 and/or of the second port 4 involves additive manufacturing such as three-dimensional printing. Manufacture of the fluid conduit and/or of the first port 3 and/or of the second port 4 may involve selective laser sintering.

FIG. 1 shows the valve seat 6 as part of the second port 4. A skilled person having reviewed the embodiments disclosed herein may understand that the first port 3 may also comprise the valve seat 6. The skilled person also understands that the valve seat 6 may be separate from the first port 3 and may be separate from the second port 4.

In the embodiment shown in FIG. 1, the valve member 5a is linearly moveable by linear movement of the armature 7a. The armature 7a may mechanically connect to the valve member 5a via a stem 8. It is also envisaged that the armature 7a directly connects to the valve member 5a.

In some embodiments, the armature 7a, the stem 8, and the valve member 5a form a single piece. That is, the stem 8 and the valve member 5a are both integral parts of the armature 7a. Likewise, the armature 7a and the steam 8 are integral with the valve member 5a.

In some embodiments, the valve member 5a is configured to rotate to some extent with respect to the armature 7a. The valve member 5a preferably rotates about an axis connecting the armature 7a, the valve member 5a, and/or the stem 8. In some embodiments, the valve member 5a is allowed to rotate by an articulation angle of 0.1 degrees or of 0.2 degrees or even of 0.5 degrees. A limited amount of articulation of the valve member 5a with respect to the armature 7a improves on the alignment of the arrangement.

In some embodiments, at least a portion of the armature 7a may be surrounded by a solenoid 9a, 9b. Upon application of an electric current, the solenoid 9a, 9b produces a magnetic flux. This magnetic flux acts on the armature 7a thereby displacing the armature 7a.

A can need not envelope the armature 7a and/or the stem 8. That is, the armature 7a has an outer surface. In some embodiments, a portion of the outer surface of the armature 7a directly faces the solenoid 9a, 9b. In some embodiments, the outer surface of the armature 7a directly faces the solenoid 9a, 9b. Likewise, the solenoid 9a, 9b has an outer surface. In an embodiment, a portion of the outer surface of the solenoid 9a, 9b directly faces the armature 7a. In another embodiment, the outer surface of the solenoid 9a, 9b directly faces the armature 7a.

The solenoid 9a, 9b and the armature 7a are arranged in the same chamber 10a inside the housing 2. The chamber 10a is ideally filled with a liquid fluid. The liquid fluid inside the chamber 10a may, by way of non-limiting example, be a R-401A, R-404A, R-406A, R-407A, R-407C, R-408A, R-409A, R-410A, R-438A, R-500, or a R-502 refrigerant.

This liquid fluid is in direct contact with the outer surface of the portion of the armature 7a that is inside the chamber 10a. The liquid fluid also is in direct contact with the solenoid 9a, 9b.

In some embodiments, the solenoid 9a, 9b comprises a plurality of coils. In some embodiments, at least one coil or at least two coils or at least five coils of the solenoid 9a, 9b are directly exposed to the liquid in the chamber 10a. In some embodiments, all the coils of the solenoid 9a, 9b are directly exposed to the liquid. The solenoid 9a, 9b preferably comprises a helical solenoid.

In some embodiments, a resilient member 11a ensures that the valve 1 is a normally closed valve. The resilient member 11a couples to the armature 7a. In a specific embodiment, the resilient member 11a mechanically connects to the armature 7a. The resilient member 11a urges the armature 7a and the valve member 5a to close the valve 1. To that end, the resilient member 11a urges the armature 7a and the valve member 5a toward the seat 6.

In some embodiments, the resilient member 11a urges the armature 7a, the stem 8, and the valve member 5a to close the valve 1. To that end, the resilient member 11a urges the armature 7a, the stem 8, and the valve member 5a toward the seat 6. The member 11a preferably urges these movable members 7a, 8, 5a toward the seat 6 until the valve member 5a engages the seat 6. The valve member 5a advantageously engages the seat 6 at a closed position.

In some embodiments, the resilient member 11a comprises a compression spring. In some embodiments, the resilient member 11a comprises a helical compression spring. The skilled person understands that a tension spring can be attached to the second port 4 and to the stem 8. The tension spring then urges the stem 8 toward the second port 4.

Figure 2:
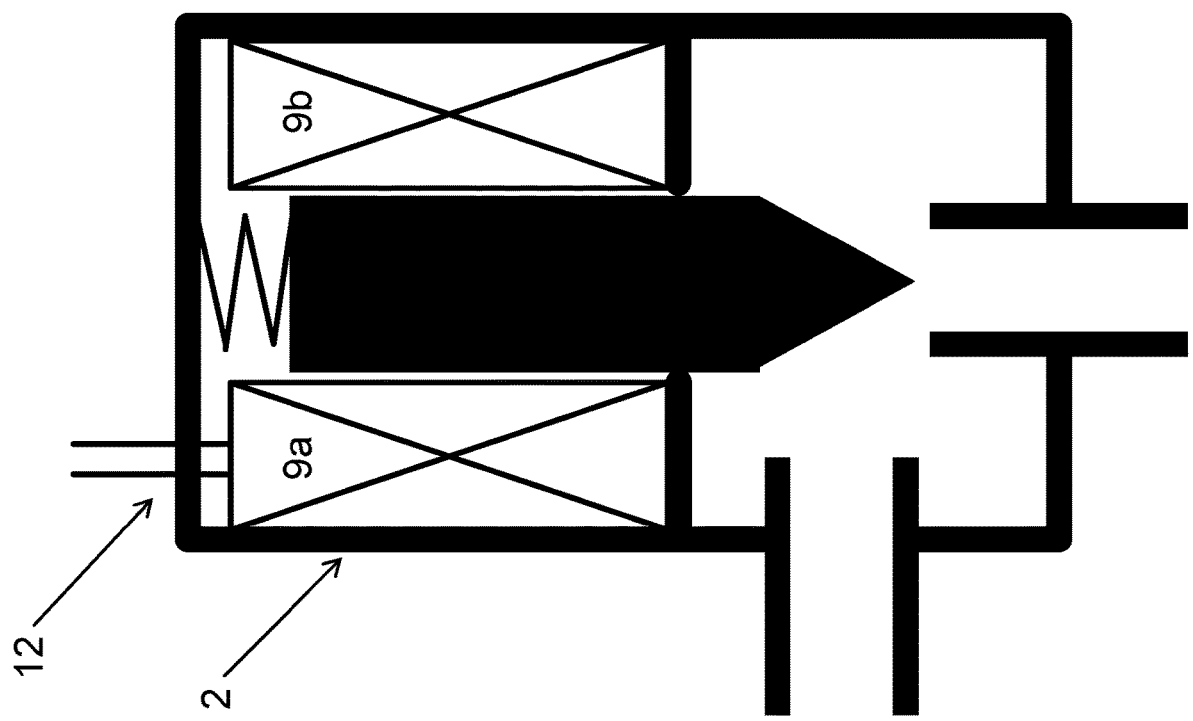
FIG. 2 depicts a valve with a pair of leads connecting to a solenoid incorporating teachings of the present disclosure.

FIG. 2 shows a pair of leads 12 that supplies the solenoid 9a, 9b with an electric current. To that end, the pair of leads 12 passes through the housing 2 of the valve 1. A gasket can be employed to envelope each lead of the pair 12 at the location where the leads 12 perforate the (wall of the) housing 2.

In some embodiments, a feed-through is employed to envelope each lead of the pair 12 at the location where the leads 12 perforate the (wall of the) housing 2. In some embodiments, the feed-through hermetically seals the housing 2. The feed-through may be or comprise a glass feed-through.

In some embodiments, the pair of leads 12 supplies the solenoid 9a, 9b with a pulse-width modulated current. In some embodiments, the pulse-width modulated current is a 400 Hertz pulse-width modulated current.

In some embodiments, the pair of leads 12 connects to an inverter not shown on FIG. 2. This inverter produces an electric current to be supplied to the solenoid 9a, 9b. The inverter may comprise a matrix converter having only a single stage of conversion.

In some embodiments, the pair of leads 12 connects to a phase-controlled modulator. The phase-controlled modulator produces an electric current to be supplied to the solenoid 9a, 9b.

FIG. 1 shows a valve 1 having a conical valve member 5a. In some embodiments, the conical valve member 5a comprises a metallic material such as steel, especially austenitic (stainless) steel and/or ferrite steel. In some embodiments, the conical valve member 5a comprises aluminum (alloy) or gunmetal or brass. In some embodiments, the conical valve member 5a comprises a polymeric material. In some embodiments, the conical valve member 5a is manufactured using an additive manufacturing technique such as three-dimensional printing. Manufacture of the conical valve member 5a may involve selective laser sintering. It is still envisaged that the conical valve member 5a comprises a grey cast material and/or of nodular cast iron.

Figure 3:
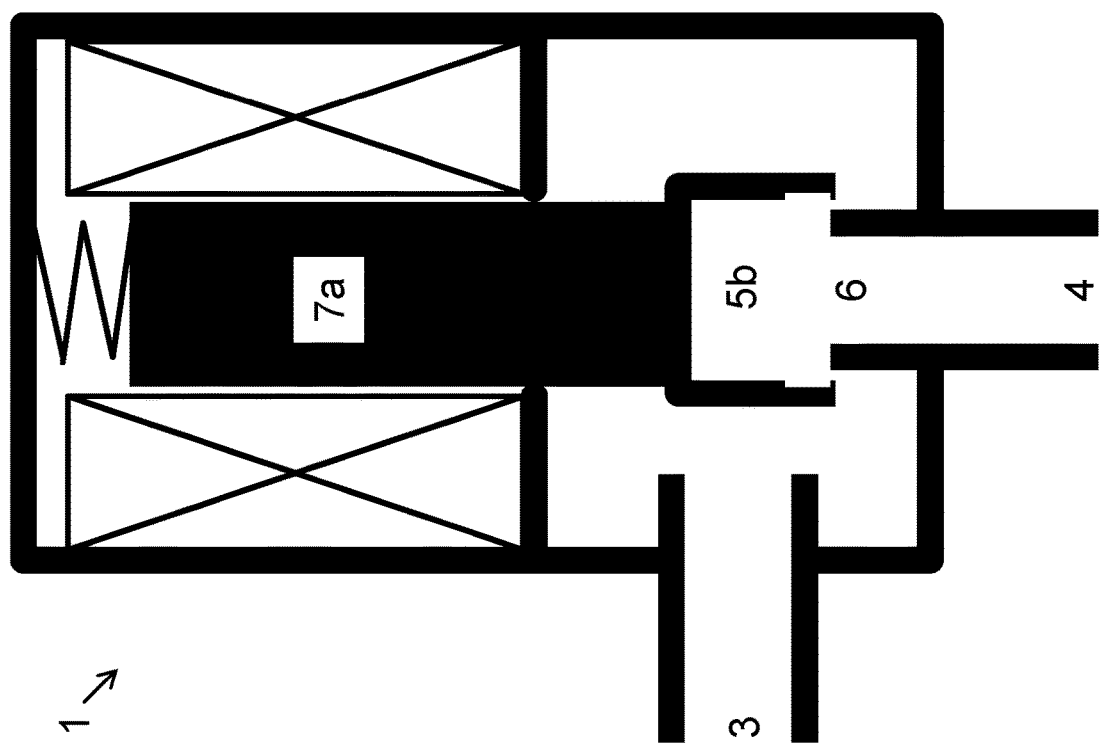
FIG. 3 shows a valve having a cup-shaped valve member incorporating teachings of the present disclosure.

The valve member may also be a cup-shaped valve member 5b. FIG. 3 shows a valve 1 having such a cup-shaped valve member 5b. In some embodiments, the cup-shaped valve member 5b comprises a metallic material such as steel, especially austenitic (stainless) steel and/or ferrite steel. In some embodiments, the cup-shaped valve member 5b comprises aluminum (alloy) or gunmetal or brass. In some embodiments, the cup-shaped valve member 5b comprises a polymeric material. In some embodiments, the cup-shaped valve member 5b is manufactured using an additive manufacturing technique such as three-dimensional printing. Manufacture of the cup-shaped valve member 5b may involve selective laser sintering. In some embodiments, the cup-shaped valve member 5b comprises a grey cast material and/or of nodular cast iron.

The valve member 5b is situated in the fluid path between the first port 3 and the second port 4. The cup-shaped valve member 5b is moveable. The valve member 5b cooperates with the valve seat 6 of the second port 4. The valve member 5b thereby varies and limits the flow rate of the fluid through the valve 1.

The valve member 5b cooperates with the valve seat 6 in that a cylindrical portion of the valve member 5b envelopes a portion of the seat 6. To that end, the valve member 5b provides a cup-shaped cylindrical portion extending toward the valve seat 6.

The cup-shaped valve member 5b is linearly moveable by linear movement of the armature 7a. The armature 7a may mechanically connect to the valve member 5b via a stem 8. In some embodiments, the armature 7a directly connects to the valve member 5b.

Figure 4:
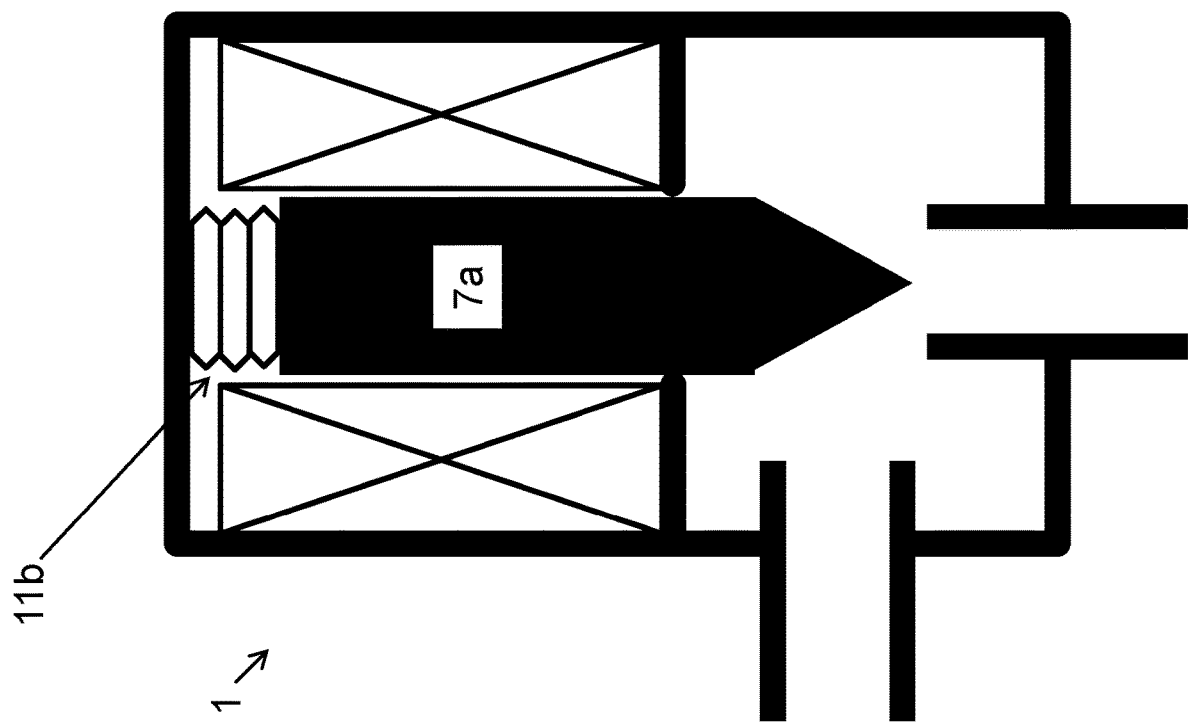
FIG. 4 is a schematic of a valve employing a stack of plate discs as a resilient member incorporating teachings of the present disclosure.

FIG. 1 shows a resilient member 11a in the form of a helical spring. The resilient member may, by way of non-limiting example, also comprise at least one leaf spring and/or at least one disc spring. FIG. 4 shows a resilient member 11b comprising at least one disc spring.

In some embodiments, the resilient member 11b comprises at least one disc spring or at least two disc springs or at least five disc springs. The resilient member 11b may comprise a stack of disc springs. Disc springs provide large energy densities and/or relative large forces. A valve 1 having a resilient member 11b in the form of at least one disc spring will instantly close in the event of a power failure.

The at least one disc spring 11b ensures that the valve 1 is a normally closed valve. The at least one disc spring 11b couples to the armature 7a. In some embodiments, the at least one disc spring 11b mechanically connects to the armature 7a.

The at least one disc spring 11b urges the armature 7a and the valve member 5a to close the valve 1. More specifically, the at least one disc spring 11b urges the armature 7a and the valve member 5a toward the seat 6. In some embodiments, the at least one disc spring 11b urges the armature 7a, the stem 8, and the valve member 5a to close the valve 1. More specifically, the at least one disc spring 11b urges the armature 7a, the stem 8, and the valve member 5a toward the seat 6. The at least one disc spring 11b preferably urges the movable members 7a, 8, 5a toward the seat 6 until the valve member 5a engages the seat 6. The valve member 5a advantageously engages the seat 6 at a closed position.

Figure 5:
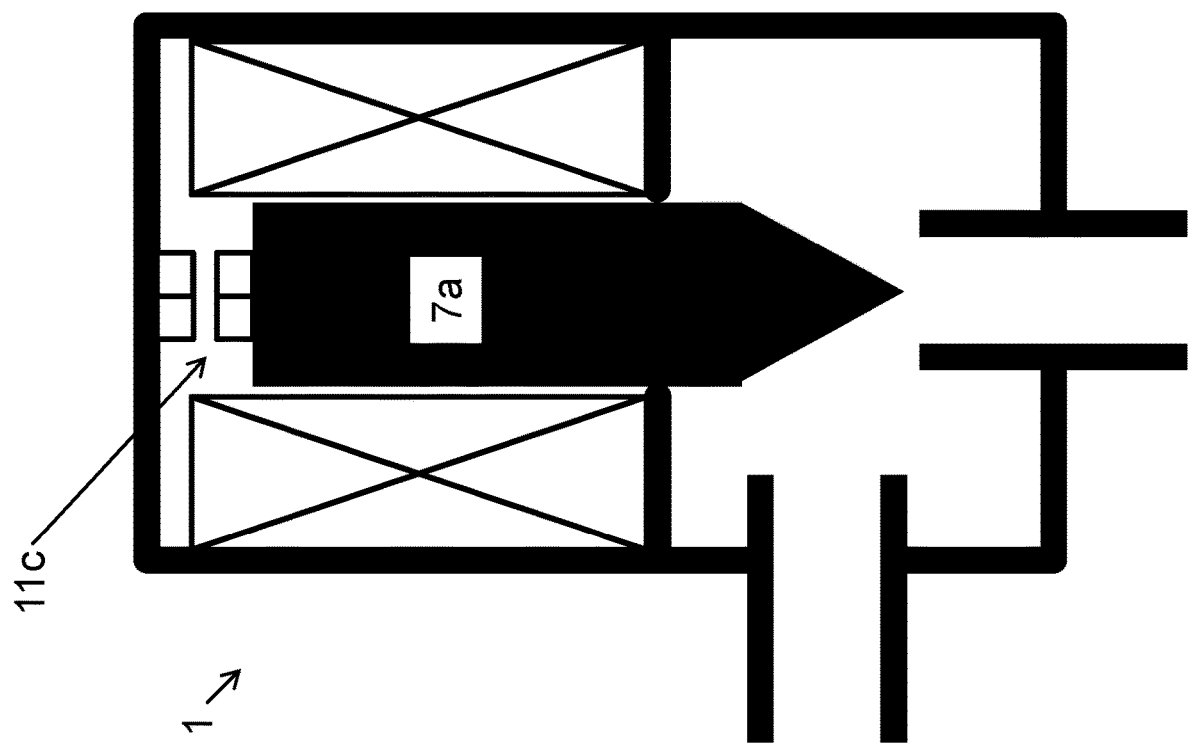
FIG. 5 depicts a valve wherein a pair of magnets forms the resilient member incorporating teachings of the present disclosure.

The resilient member may, by way of non-limiting example, also comprise a pair of permanent magnets. FIG. 5 shows a resilient member 11c comprising a pair of permanent magnets. Valves 1 employing permanent magnets 11c instead of mechanical springs 11a, 11b afford minimum mechanical wear. The pair of permanent magnets 11c ensures that the valve 1 is a normally closed valve. The pair of permanent magnets 11c couples to the armature 7a. In a specific embodiment, the pair of permanent magnets 11c mechanically connects to the armature 7a.

The pair of permanent magnets 11c urges the armature 7a and the valve member 5a to close the valve 1. To that end, the pair of permanent magnets 11c urges the armature 7a and the valve member 5a toward the seat 6. In a specific embodiment, the pair of permanent magnets 11c urges the armature 7a, the stem 8, and the valve member 5a to close the valve 1. More specifically, the pair of permanent magnets 11c urges the armature 7a, the stem 8, and the valve member 5a toward the seat 6. The pair of permanent magnets 11c preferably urges the movable members 7a, 8, 5a toward the seat 6 until the valve member 5a engages the seat 6. The valve member 5a advantageously engages the seat 6 at a closed position.

In some embodiments, the pair of permanent magnets comprises a neodymium NdFeB magnet selected from at least one of a: sintered $Nd_2Fe_{14}B$ magnet, or a bonded $Nd_2Fe_{14}B$ magnet.

In some embodiments, the pair of permanent magnets comprises a samarium-cobalt SmCo magnet selected from at least one of a: sintered $SmCo_5$ magnet, or a sintered $Sm(Co, Fe, Cu, Zr)_7$ magnet.

In some embodiments, a first magnet of the pair of permanent magnets 11c is coupled to or mounted to the inside of the housing 2. A second magnet of the pair of permanent magnets 11c may, by way of non-limiting example, be coupled to and/or be mounted to the armature 7a.

Figure 6:
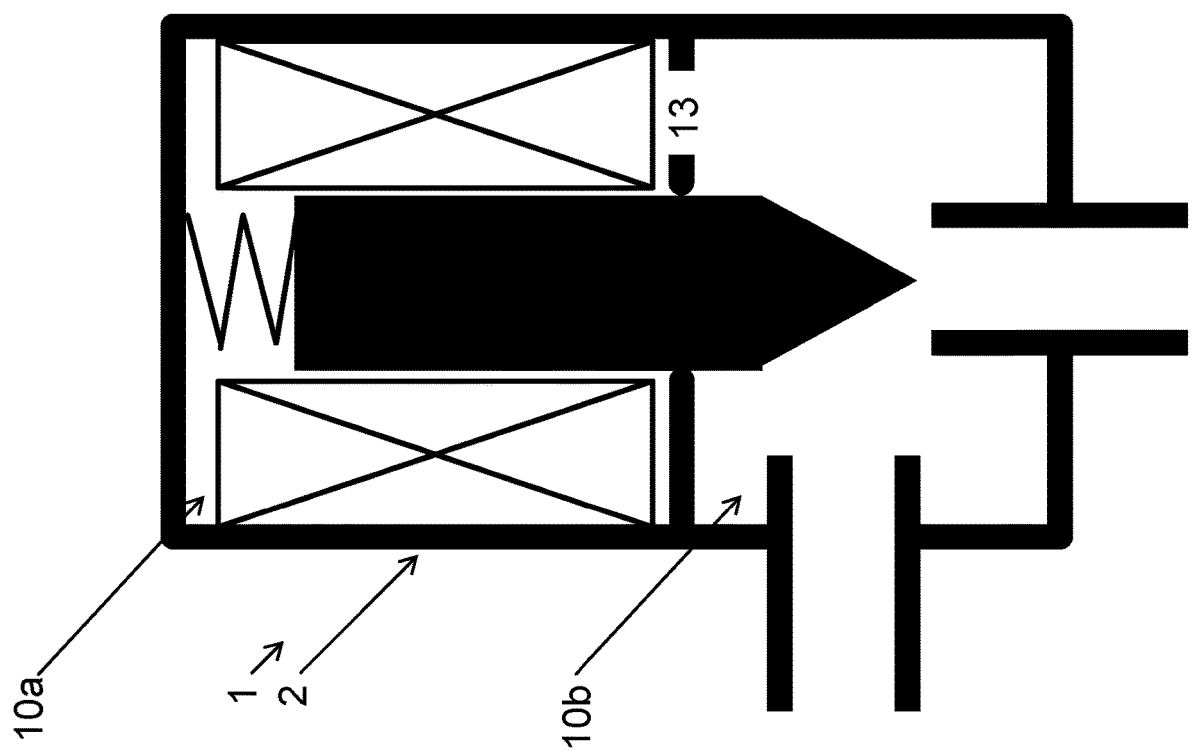
FIG. 6 shows a valve wherein a housing of the valve comprises a first chamber and a second chamber, the first chamber being in fluid communication with the second chamber incorporating teachings of the present disclosure.

The refrigerant inside the fluid path may be employed to inhibit overheating of the solenoid 9a, 9b. FIG. 6 shows a valve 1 having a first chamber 10a and a second chamber 10b arranged inside the housing 2. The first chamber 10a is in fluid communication with the second chamber 10b via a through-hole 13. In some embodiments, the through-hole 13 is or comprises a bore through a wall disposed between the chambers 10a and 10b that surrounds the armature 7a. The chambers 10a and 10b may be filled with the same liquid fluid. The liquid fluid inside the chambers 10a, 10b may, by way of non-limiting example, be a R-401A, R-404A, R-406A, R-407A, R-407C, R-408A, R-409A, R-410A, R-438A, R-500, or a R-502 refrigerant.

Figure 7:
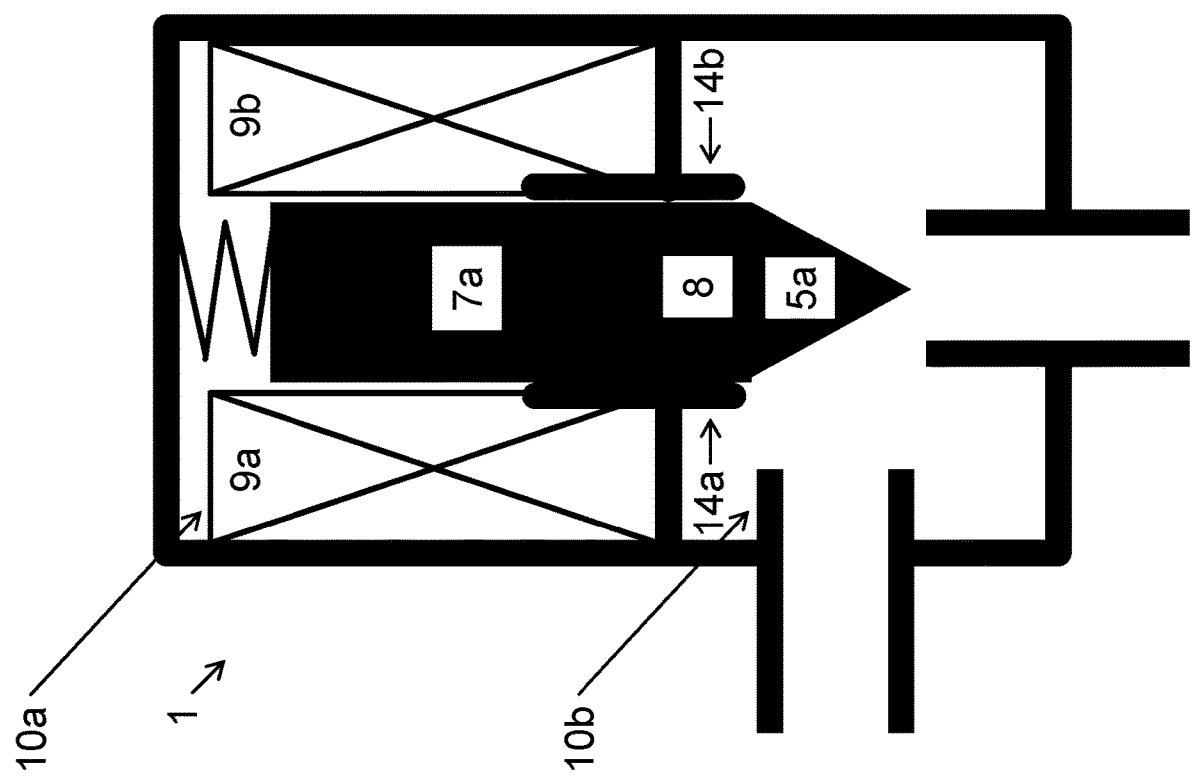
FIG. 7 illustrates a valve having a guide member incorporating teachings of the present disclosure.

The valve 1 may further comprise a guide member for the armature 7a and/or for the stem 8. A guide member 14a, 14b is shown in FIG. 7. The guide member 14a, 14b may be arranged near an end of the chamber 10a. The guide member 14a, 14b may be arranged where the armature 7a and/or the stem 8 passes from the first chamber 10a to the second chamber 10b. To that end, a wall separates the first chamber 10a from the second chamber 10b. The wall separating the two chambers 10a, 10b comprises an orifice. The armature 7a and/or the stem 8 may pass through this orifice. The guide member 14a, 14b may be arranged at the orifice between the two chambers 10a, 10b.

In some embodiments, the guide member 14a, 14b comprises a sleeve. The sleeve envelopes the armature 7a and/or the stem 8. In some embodiments, the guide member 14a, 14b forms a slide bearing. In some embodiments, the bearing formed by the guide member 14a, 14b and/or by the sleeve is optimized for minimum friction and/or for minimum hysteresis.

In some embodiments, the guide member 14a, 14b affords a limited clearance. The two chambers 10a, 10b are thus in fluid communication by virtue of the clearance afforded by the guide member 14a, 14b. In some embodiments, a clearance is formed between the guide member 14a, 14b and the armature 7a and/or the stem 8. The maximum width of the clearance may be 40 micrometers or 100 micrometers or even 200 micrometers.

In some embodiments, the guide member 14a, 14b is a bore and/or a through-hole through the wall that separates the first chamber 10a from the second chamber 10b. In some embodiments, the bearing formed by the bore and/or by the through-hole is optimised for minimum friction and/or for minimum hysteresis.

In some embodiments, the guide member comprises a cup-shaped member and/or a cage and/or a can 5b. In some embodiments, the cup-shaped member and/or the cage and/or the can 5b forms a slide bearing. In some embodiments, the bearing formed by the cup-shaped member and/or the cage and/or the can 5b is optimized for minimum friction and/or for minimum hysteresis.

Figure 8:
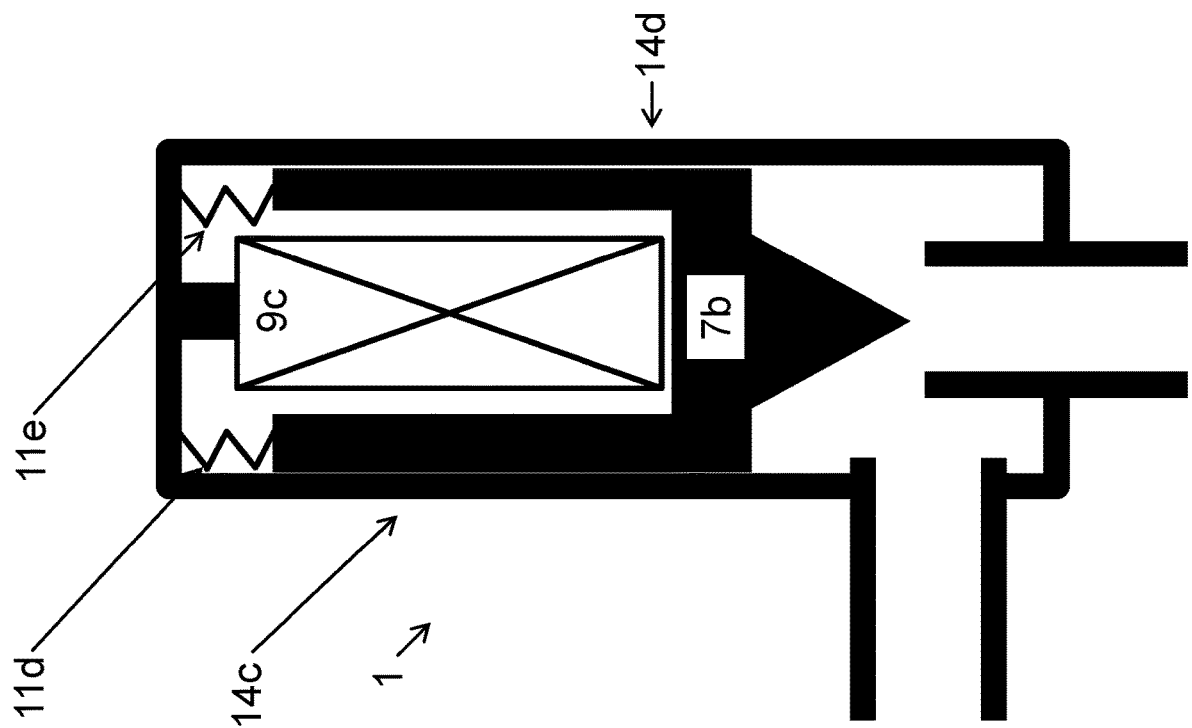
FIG. 8 schematically shows a valve having a solenoid inside the armature incorporating teachings of the present disclosure.

The solenoid 9a, 9b of the valve 1 disclosed herein needs not be arranged outside the armature 7a. The solenoid 9c may also be arranged inside the armature 7b. FIG. 8 shows an armature 7b that envelopes a solenoid 9c. In this embodiment, the armature 7b has a surface that defines a slot in the armature 7b to receive the solenoid 9c. The sidewalls 14c, 14d of the housing 2 function as a guide member. The sidewalls 14c, 14d of the housing 2 advantageously form lateral walls of the housing 2.

In some embodiments, the sidewalls 14c, 14d of the housing 2 forms a slide bearing. In some embodiments, the bearing formed by the sidewalls 14c, 14d is optimised for minimum friction and/or for minimum hysteresis.

Figure 9:
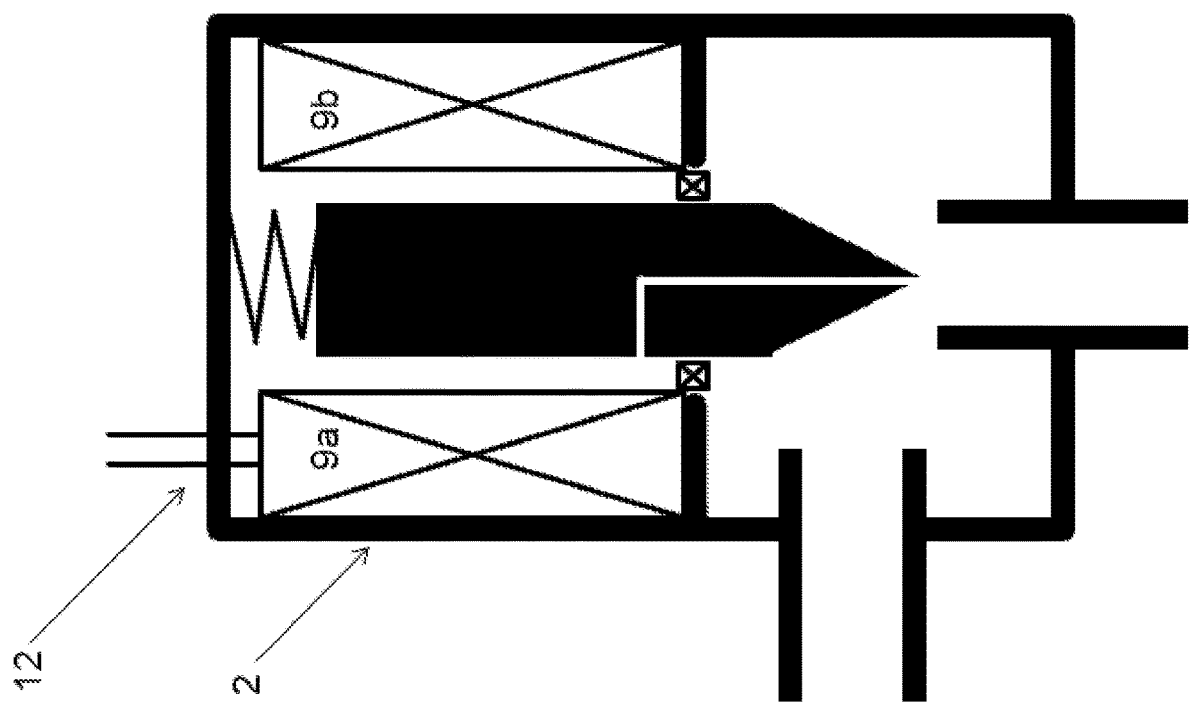
FIG. 9 depicts a valve having a dynamic seal incorporating teachings of the present disclosure.

A dynamic seal is shown in FIG. 9. In some embodiments, a guide member 14a, 14b as shown in FIG. 7 comprises a dynamic seal. The dynamic seal may envelope the armature 7a and/or the stem 8.

In some embodiments, the valve 1 comprises at least one guide member 14a-14d. The valve 1 can also comprise a plurality of guide members 14a-14d. A plurality of guide members 14a-14d precisely aligns the moving parts and the fixed parts of the valve 1.

In some embodiments, the orifice 13 as shown in FIG. 6 can be replaced by a conduit perforating the armature 7a and/or the stem and/or the valve member 5a. The conduit connects the first chamber 10a and the second chamber 10b. The conduit through the armature 7a and/or through the stem 8 and/or the valve member 5a affords fluid communication between the two chambers 10a, 10b.

Figure 10:
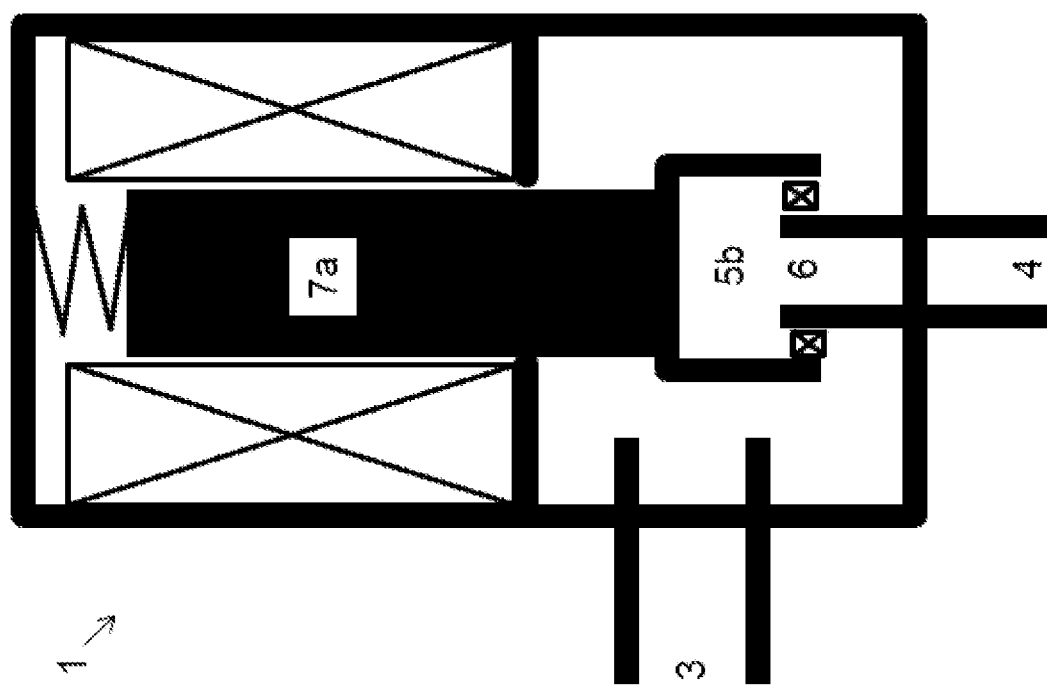
FIG. 10 depicts a valve having a cup-shaped valve member and a dynamic seal incorporating teachings of the present disclosure.

In the embodiment shown in FIG. 10, the cup-shaped valve member 5b comprises a dynamic seal. The dynamic seal envelopes the second port 4 and/or the valve seat 6. In some embodiments, the second port 4 comprises the dynamic seal.

The teachings of the instant disclosure apply to two-way valves as well as to three-way valves. In some embodiments, a valve (1) comprises: a first port (3), a second port (4), and a fluid path extending between the first port (3) and the second port (4); a valve member (5a; 5b) situated in the fluid path between the first port (3) and the second port (4), the valve member (5a; 5b) being selectively moveable between a closed position, which closes the fluid path between the first port (3) and the second port (4), and an open position, which opens the fluid path between the first port (3) and the second port (4); an armature (7a; 7b) coupled to the valve member (5a; 5b) and having a surface; a solenoid (9a, 9b; 9c), the solenoid (9a, 9b; 9c) and the armature (7a; 7b) forming a linear actuator. A portion of the surface of the armature (7a; 7b) directly faces the solenoid (9a, 9b; 9c).

In some embodiments, the valve (1) is a pressure-compensated valve and/or a pressure-balanced valve. Pressure-compensated valves afford large pressure differences between the first port (3) and the second port (4). Also, a pressure-balanced valve for any given pressure difference employs a small linear actuator compared to an unbalanced valve.

In some embodiments, the valve (1) is or comprises an expansion valve. In some embodiments, the valve (1) is or comprises an electronic expansion valve.

In some embodiments, the solenoid (9a, 9b; 9c) is or comprises an electromagnetic solenoid. In some embodiments, the armature (7a; 7b) is or comprises a magnetic armature.

The surface of the armature (7a; 7b) comprises a portion. The portion of the surface of the armature (7a; 7b) may, by way of non-limiting examples, cover half the surface of the armature (7a; 7b), three quarters of the surface of the armature (7a; 7b), or even ninety percent of the surface of the armature (7a; 7b).

In some embodiments, the solenoid (9a, 9b; 9c) comprises a plurality of coils. The portion of the surface of the armature (7a; 7b) directly faces at least one coil of the plurality of coils. In some embodiments, the portion of the surface of the armature (7a; 7b) directly faces the plurality of coils of the solenoid (9a, 9b; 9c).

The portion of the surface of the armature (7a; 7b) directly faces the solenoid (9a, 9b; 9c) such that no can and no wall of a can is situated in between the armature (7a; 7b) and the solenoid (9a, 9b; 9c). The portion of the surface of the armature (7a; 7b) also directly faces the solenoid (9a, 9b; 9c) such that no envelope is situated in between the armature (7a; 7b) and the solenoid (9a, 9b; 9c). Further, the portion of the surface of the armature (7a; 7b) directly faces the solenoid (9a, 9b; 9c) such that no sheet is situated in between the armature (7a; 7b) and the solenoid (9a, 9b; 9c).

In some embodiments, the valve member (5a; 5b) is or comprises a plug. In some embodiments, the valve member (5a; 5b) is or comprises a valve plug.

In some embodiments, the valve (1) comprises a valve seat (6) mounted to and/or being part of the second port (4). The valve member (5a; 5b) may be configured to cooperate with the valve seat (6). In the closed position, the valve member (5a; 5b) seals the valve seat (6). In the open position, the valve member (5a; 5b) is removed from the valve seat (6).

In some embodiments, the valve (1) comprises a valve seat (6) mounted to and/or being part of the first port (3). The valve member (5a; 5b) may be configured to cooperate with the valve seat (6). In the closed position, the valve member (5a; 5b) seals the valve seat (6). In the open position, the valve member (5a; 5b) is at a distance from the valve seat (6).

In some embodiments, the valve member (5a) is or comprises a conical valve member. In some embodiments, the valve seat (6) is or comprises a funnel-shaped valve seat. In some embodiments, the valve seat (6) is or comprises a V-shaped valve seat.

In some embodiments, the valve member (5a; 5b) is situated in the fluid path between the first port (3) and the second port (4), the valve member (5a; 5b) being selectively and linearly moveable between a closed position, which closes the fluid path between the first port (3) and the second port (4), and an open position, which opens the fluid path between the first port (3) and the second port (4).

In some embodiments, the valve member (5a; 5b) is situated in the fluid path between the first port (3) and the second port (4), the valve member (5a; 5b) being continuously moveable between a closed position, which closes the fluid path between the first port (3) and the second port (4), and an open position, which opens the fluid path between the first port (3) and the second port (4).

In some embodiments, the valve member (5a; 5b) is situated in the fluid path between the first port (3) and the second port (4), the valve member (5a; 5b) being continuously and linearly moveable between a closed position, which closes the fluid path between the first port (3) and the second port (4), and an open position, which opens the fluid path between the first port (3) and the second port (4).

In some embodiments, the first port (3) is or comprises an inlet port. In some embodiments, the first port (3) is or comprises an inlet conduit.

In some embodiments, the second port (4) is or comprises an outlet port. In some embodiments, the second port (4) is or comprises an outlet conduit.

In some embodiments, the valve (1) comprises a pair of leads (12) connected to the solenoid (9a, 9b; 9c). The pair of leads (12) electrically and mechanically connects to the solenoid (9a, 9b; 9c). The pair of leads (12) is configured to supply an electric current to the solenoid (9a, 9b; 9c).

In some embodiments, the pair of leads (12) is configured to supply an electric current to the solenoid (9a, 9b; 9c), the electric current producing a magnetic flux at the location of the armature (7a; 7b), the magnetic flux causing movement of the armature (7a; 7b). In some embodiments, the magnetic flux causes linear movement of the armature (7a; 7b).

In some embodiments, the surface of the armature (7a; 7b) is or comprises a cylindrical surface. In some embodiments, the surface of the armature (7a) directly faces the solenoid (9a, 9b). In some embodiments, the entire surface of the armature (7a) directly faces the solenoid (9a, 9b). The surface of the armature (7a) directly faces the solenoid (9a, 9b) such that no can and no wall of a can is situated in between the armature (7a) and the solenoid (9a, 9b). The surface of the armature (7a) also directly faces the solenoid (9a, 9b) such that no envelope is situated in between the armature (7a) and the solenoid (9a, 9b). Further, the portion of the surface of the armature (7a) directly faces the solenoid (9a, 9b) such that no sheet is situated in between the armature (7a) and the solenoid (9a, 9b).

In some embodiments, the surface of the armature (7a) is an outer surface and a portion of the outer surface of the armature (7a) directly faces the solenoid (9a, 9b). The outer surface of the armature (7a) may envelop the armature (7a). In some embodiments, the outer surface of the armature (7a) is or comprises a cylindrical surface. In some embodiments, the outer surface of the armature (7a) directly faces the solenoid (9a, 9b). In some embodiments, the entire outer surface of the armature (7a) directly faces the solenoid (9a, 9b). The outer surface of the armature (7a) directly faces the solenoid (9a, 9b) such that no can and no wall of a can is situated in between the armature (7a) and the solenoid (9a, 9b). The outer surface of the armature (7a) also directly faces the solenoid (9a, 9b) such that no envelope is situated in between the armature (7a) and the solenoid (9a, 9b). Further, the outer surface of the armature (7a) directly faces the solenoid (9a, 9b) such that no sheet is situated in between the armature (7a) and the solenoid (9a, 9b).

In some embodiments, the armature (7b) has a slot and a surface enveloping the slot and the surface enveloping the slot directly faces the solenoid (9c). In some embodiments, the surface of the armature (7b) defines a slot in the armature (7b) and the slot receives the solenoid such that the surface envelopes and directly faces the solenoid (9c).

In some embodiments, the armature (7b) has an inner surface that defines a slot in the armature (7b) and the slot receives the solenoid such that the surface envelopes and directly faces the solenoid (9c). The surface enveloping and/or defining the slot may be a cylindrical surface. The surface enveloping and/or defining the slot directly faces the solenoid (9c) such that no can and no wall of a can is situated in between the armature (7b) and the solenoid (9c). The surface enveloping and/or defining the slot also directly faces the solenoid (9c) such that no envelope is situated in between the armature (7b) and the solenoid (9c). Further, the surface enveloping and/or defining the slot directly faces the solenoid (9c) such that no sheet is situated in between the armature (7b) and the solenoid (9c).

A portion of the solenoid (9c) may be received in and/or situated inside the slot of the armature (7b). In some embodiments, the solenoid (9c) is situated inside the slot of the armature (7b). In some embodiments, the solenoid (9c) is entirely situated inside the slot of the armature (7b). The surface enveloping and/or defining the slot of the armature (7b) may be a cylindrical surface.

In some embodiments, a connector such as a mechanical connector connects the solenoid (9c) to the housing (2).

In some embodiments, the valve (1) comprises a housing (2) and the solenoid (9a, 9b; 9c), the armature (7a; 7b), and the valve member (5a; 5b) are situated inside the housing (2).

In some embodiments, the first port (3) perforates the (wall of the) housing (2). The housing (2) may include the first port (3). The second port (4) may also perforate the (wall of the) housing (2). The housing (2) may include the second port (4).

In some embodiments, the pair of leads (12) passes through the housing (2). A gasket may be arranged where the pair of leads (12) passes through the housing (2), the gasket thereby sealing the housing (2).

In some embodiments, a feed-through is arranged where the pair of leads (12) passes through the housing (2), the feed-through thereby sealing the housing (2). The feed-through hermetically seals the housing (2). The feed-through may be or comprise a glass feed-through. A glass feed-through confers advantages in terms of sealed connections at elevated pressures. The feed-through may also be or comprise an epoxy feed-through. The feed-through can further be or comprise a ceramics feed-through.

In some embodiments, the solenoid (9a, 9b; 9c) is rigidly mounted to the housing (2). In other words, the solenoid (9a, 9b; 9c) does not move relative to the housing (2). In some embodiments, the armature (7a; 7b) is moveably mounted to the housing (2).

In some embodiments, the valve member (5b) is or comprises a cup-shaped valve member. The cup-shaped valve member (5b) may comprise a portion configured to envelope the valve seat (6). In some embodiments, the cup-shaped valve member (5b) comprises a cylindrical portion or a substantially cylindrical portion. The cylindrical or substantially cylindrical portion is configured to envelope the valve seat (6). In some embodiments, the valve seat (6) is a cylindrical or is a substantially cylindrical portion of the second port (4). The valve seat (6) is as such arranged inside the housing (2). In some embodiments, the valve seat (6) is a cylindrical or is a substantially cylindrical portion of the first port (3). The valve seat (6) is as such arranged inside the housing (2).

In some embodiments, there is a housing (2), wherein the housing (2) comprises a first chamber (10a); wherein the solenoid (9a, 9b; 9c) is situated inside the first chamber (10a); wherein the armature (7a; 7b) has a first portion; wherein the first portion of the armature (7a; 7b) is situated inside the first chamber (10a).

In some embodiments, the armature (7a; 7b) is entirely situated inside the first chamber (10a).

In some embodiments, the solenoid (9a, 9b; 9c) is rigidly mounted to the first chamber (10a). In other words, the solenoid (9a, 9b; 9c) does not move relative to the first chamber (10a). The first chamber (10a) may comprise an inner surface and the solenoid (9a, 9b; 9c) is rigidly mounted to the inner surface of the first chamber (10a).

The first chamber (10a) may comprise an outer wall and the pair of leads (12) passes through the outer wall of the first chamber (10a). A gasket may be arranged where the pair of leads (12) passes through the outer wall of the first chamber (10a), the gasket thereby sealing the first chamber (10a).

In some embodiments, there is a first chamber (10a), wherein the first chamber (10a) comprises an inner surface; wherein the valve (1) comprises a resilient member (11a-11e); wherein the resilient member (11a-11e) mechanically connects to the inner surface of the first chamber (10a); wherein the resilient member (11a-11e) mechanically connects to the armature (7a; 7b); and wherein the resilient member (11a-11e) urges the armature (7a; 7b) and the valve member (5a; 5b) toward the closed position of the valve (1).

In some embodiments, the resilient member (11a-11e) is mounted to the inner wall of the first chamber (10a); and the resilient member (11a-11e) is mounted to the armature (7a; 7b).

In some embodiments, the resilient member (11a-11e) is secured relative to the inner wall of the first chamber (10a); and the resilient member (11a-11e) is secured relative to the armature (7a; 7b).

In some embodiments, there is a valve seat (6) and the resilient member (11a-11e) urges the armature (7a; 7b) and the valve member (5a; 5b) toward the valve seat (6).

In some embodiments, there is a stem (8) coupled to the armature (7a; 7b) and coupled to the valve member (5a; 5b), the resilient member (11a-11e) urges the armature (7a; 7b), the stem (8), and the valve member (5a; 5b) toward the closed position of the valve (1).

In some embodiments, there is a valve seat (6) and a stem (8) coupled to the armature (7a; 7b) and coupled to the valve member (5a; 5b), the resilient member (11a-11e) urges the armature (7a; 7b), the stem (8), and the valve member (5a; 5b) toward the valve seat (6).

In some embodiments, the resilient member (lib) comprises at least one disc spring or at least two disc springs or at least five disc springs. The resilient member (lib) may comprise a stack of disc springs (11b).

In some embodiments, the resilient member (11c) comprises a pair of permanent magnets. The pair of permanent magnets may, by way of non-limiting example, comprise a neodymium NdFeB magnet selected from at least one of a: sintered $Nd_2Fe_{14}B$ magnet, or a bonded $Nd_2Fe_{14}B$ magnet. In some embodiments, the pair of permanent magnets comprises a samarium-cobalt SmCo magnet selected from at least one of a: sintered $SmCo_5$ magnet, or a sintered $Sm(Co, Fe, Cu, Zr)_7$ magnet.

In some embodiments, there is a first chamber (10a), wherein the first chamber (10a) is filled with a refrigerant; and the solenoid (9a, 9b; 9c) and the first portion of the armature (7a; 7b) are directly exposed to the refrigerant. The refrigerant may be a fluid such as a liquid fluid. The refrigerant may be selected from at least one of a R-401A, R-404A, R-406A, R-407A, R-407C, R-408A, R-409A, R-410A, R-438A, R-500, or a R-502 refrigerant. In some embodiments, the resilient member (11a-11e) is also directly exposed to the refrigerant.

In some embodiments, the solenoid (9a, 9b; 9c) and the first portion of the armature (7a; 7b) are immersed in the refrigerant. In some embodiments, the solenoid (9a, 9b; 9c) and the armature (7a; 7b) are immersed in the refrigerant. In some embodiments, there is a resilient member (11a-11e), the solenoid (9a, 9b; 9c), the first portion of the armature (7a; 7b), and the resilient member (11a-11e) are immersed in the refrigerant. In some embodiments, the solenoid (9a, 9b; 9c), the armature (7a; 7b), and the resilient member (11a-11e) are immersed in the refrigerant. In some embodiments, there is a resilient member (11a-11e) and a pair of leads (12), wherein the pair of leads (12) comprises an inside portion situated inside the first chamber (10a), the solenoid (9a, 9b; 9c), the first portion of the armature (7a; 7b), the resilient member (11a-11e), and the inside portion of the pair of leads (12) are immersed in the refrigerant. In some embodiments, the solenoid (9a, 9b; 9c), the armature (7a; 7b), the resilient member (11a-11e), and the inside portion of the pair of leads (12) are immersed in the refrigerant.

In some embodiments, there is a first chamber (10a) filled with a refrigerant, wherein the solenoid (9a, 9b; 9c) comprises a plurality of coils and at least one coil of the plurality of coils is directly exposed to the refrigerant.

In some embodiments, at least one coil of the plurality of coils is directly exposed to the refrigerant. In some embodiments, at least two coils of the plurality of coils are directly exposed to the refrigerant. In some embodiments, the plurality of coils comprises more than four coils and that at least five coils of the plurality of coils are directly exposed to the refrigerant. In some embodiments, the plurality of coils comprises more than five coils and that at least five coils of the plurality of coils are directly exposed to the refrigerant. In some embodiments, all the coils of the plurality of coils are directly exposed to the refrigerant.

In some embodiments, at least one coil of the plurality of coils is immersed in the refrigerant. In some embodiments, at least two coils of the plurality of coils are immersed in the refrigerant. In some embodiments, the plurality of coils comprises more than four coils and that at least five coils of the plurality of coils are immersed in the refrigerant. In some embodiments, the plurality of coils comprises more than five coils and that at least five coils of the plurality of coils are immersed in the refrigerant. In some embodiments, all the coils of the plurality of coils are immersed in the refrigerant.

In some embodiments, there is a first chamber (10a), wherein the housing (2) comprises a second chamber (10b); the valve member (5a; 5b) is situated inside the second chamber (10b); the second chamber (10b) comprises an outer wall; and the first port (3) and the second port (4) pass through the outer wall of the second chamber (10b).

In some embodiments, the armature (7a; 7b) comprises a second portion, the second portion of the armature (7a; 7b) being different from the first portion of the armature (7a; 7b); and the second portion of the armature (7a; 7b) is situated inside the second chamber (10b). In some embodiments, the valve seat (6) is situated inside the second chamber (10b). The first port (3) may perforate the (wall of the) second chamber (10b). The second chamber (10b) may comprise the first port (3). The second port (4) may also perforate the (wall of the) second chamber (10b). The second chamber (10b) may include the second port (4).

In some embodiments, there is a first chamber (10a) and a second chamber (10b), wherein the valve (1) comprises a partition wall in between the first chamber (10a) and the second chamber (10b); wherein the partition wall comprises an orifice (13) such that the first chamber (10a) is in fluid communication with the second chamber (10b). In some embodiments, the valve (1) is in its open position, the first port (3) is in fluid communication with the first chamber (10a) via the second chamber (10b) and via the orifice (13). In some embodiments, the valve (1) is in its open position, the second port (4) is in fluid communication with the first chamber (10a) via the second chamber (10b) and via the orifice (13).

Where the valve (1) comprises a single valve seat (6) for cooperation with the valve member (5a; 5b) and where the first port (3) comprises the single valve seat (6), the second port (4) is always in fluid communication with the first chamber (10a) via the second chamber (10b) and via the orifice (13). Where the valve (1) comprises a single valve seat (6) for cooperation with the valve member (5a; 5b) and where the second port (4) comprises the single valve seat (6), the first port (3) is always in fluid communication with the first chamber (10a) via the second chamber (10b) and via the orifice (13).

In some embodiments, the orifice (13) is a through-hole. The orifice (13) may be different from an aperture, the aperture enabling linear movement the armature (7a; 7b) and/or of the stem (8) from the first chamber (10a) to the second chamber (10b) and vice versa.

In some embodiments, the valve (1) comprises a guide member (14a-14d); wherein the guide member (14a-14d) restricts movements of the armature (7a; 7b) to linear movements of the armature (7a; 7b).

In some embodiments, there is a valve seat (6) and the guide member (14a-14d) restricts movements of the armature (7a; 7b) to linear movements of the armature (7a; 7b); and the guide member (14a-14d) restricts movements of the armature (7a; 7b) to linear movements toward the valve seat (6) and/or away from the valve seat (6). The guide member (14a-14d) may also restrict movements of the valve member (5a; 5b) to linear movements of the valve member (5a; 5b).

In some embodiments, there is a stem (8) coupled to the armature (7a; 7b) and coupled to the valve member (5a; 5b), the guide member (14a-14d) may further restrict movements of the stem (8) to linear movements of the stem (8).

In some embodiments, the guide member (14a, 14b) is or comprises a sleeve. In some embodiments, the housing (2) comprises a pair of sidewalls and that the guide member (14c, 14d) is or comprises the pair of sidewalls.

In some embodiments, there is a guide member (14a, 14b) and a partition wall, wherein the guide member (14a, 14b) comprises a sleeve mounted to the partition wall; and the guide member (14a, 14b) forms a slide bearing. In some embodiments, the guide member (14a, 14b) is different from the housing (2).

In some embodiments, the guide member (14a, 14b) forms a friction bearing.

The instant disclosure still teaches any valve of the aforementioned valves (1), wherein the armature (7a; 7b) mechanically connects to the valve member (5a; 5b); and a linear movement of the armature (7a; 7b) causes a linear movement of the valve member (5a; 5b). In some embodiments, a linear movement of the valve member (5a; 5b) causes a linear movement of the armature (7a; 7b).

In some embodiments, the armature (7a; 7b) mechanically connects to a stem (8). The stem (8) then mechanically connects to the valve member (5a; 5b). Accordingly, a linear movement of the armature (7a; 7b) causes a linear movement of the stem (8). A linear movement of the stem (8) then causes a linear movement of the valve member (5a; 5b). Also, a linear movement of the valve member (5a; 5b) causes a linear movement of the stem (8). A linear movement of the stem (8) then causes a linear movement of the armature (7a; 7b).

In some embodiments, the armature (7a; 7b) and the valve member (5a; 5b) are arranged along a straight line. In some embodiments, there is a stem (8), and the armature (7a; 7b), the stem (8), and the valve member (5a; 5b) are arranged along a straight line. In some embodiments, the stem (8), the valve seat (6), the armature (7a; 7b), and the valve member (5a; 5b) are arranged along one straight line.

In some embodiments, the centre of the armature (7a; 7b), the centre of the stem (8), and the centre of the valve member (5a; 5b) are arranged along a straight line. In some embodiments, the centre of the armature (7a; 7b), the centre of the stem (8), the centre of the valve member (5a; 5b), and the centre of the valve seat (6) are arranged along one straight line.

In some embodiments, the centre of mass of the armature (7a; 7b), the centre of mass of the stem (8), and the centre of mass of the valve member (5a; 5b) are arranged along one straight line. In some embodiments, the centre of mass of the armature (7a; 7b), the centre of mass of the stem (8), the centre of mass of the valve member (5a; 5b), and the centre of mass of the valve seat (6) are arranged along one straight line.

In some embodiments, there is a second chamber (10) and a housing (2), wherein the valve (1) comprises a third port; wherein the third port perforates the (wall of the) second chamber (10b); and wherein the third port perforates the (wall of the) housing (2).

In some embodiments, the third port is or comprises an inlet port. In some embodiments, the third port is or comprises an inlet conduit. In some embodiments, the third port is or comprises an outlet port. In some embodiments, the third port is or comprises an outlet conduit.

It should be understood that the foregoing relates only to certain embodiments of the teachings of the instant disclosure and that numerous changes may be made therein without departing from the scope of the disclosure as defined by the following claims. It should also be understood that the disclosure is not restricted to the illustrated embodiments and that various modifications may be made within the scope of the following claims.

REFERENCE NUMERALS 1 valve
2 housing
3 first port
4 second port
5a, 5b valve member
6 valve seat
7a; 7b armature
8 stem
9a, 9b; 9c solenoid
10a first chamber
10b second chamber
11a; 11b, 11c resilient member
12 pair of leads
13 orifice
14a, 14b; 14c, 14d guide member

The invention claimed is:
1. A valve comprising:
a housing with a first chamber for a refrigerant;
a first port;
a second port;

a fluid path extending between the first port and the second port;

a valve member situated in the fluid path, the valve member selectively moveable between a closed position, blocking the fluid path, and an open position;

an armature coupled to and moving with the valve member and having a radially exterior surface;

a guide member forming a bearing for movement of the armature; and a solenoid comprising a plurality of coils forming a linear actuator with the armature;

wherein at least a portion of the radially exterior surface of the armature directly faces the solenoid;

the solenoid is situated inside the first chamber; and the armature has a first portion situated inside the first chamber; and at least one of the plurality of coils and the first portion of the armature are directly exposed to any refrigerant in the first chamber.

2. The valve according to claim 1, wherein:
the first chamber comprises an inner surface;
the valve comprises a resilient member mechanically connected to the inner surface of the first chamber and to the armature; and
the resilient member urges the armature and the valve member toward the closed position of the valve.

3. The valve according to claim 1, wherein:
the housing comprises a second chamber;
the valve member is situated inside the second chamber;
the second chamber comprises an outer wall; and
the first port and the second port pass through the outer wall of the second chamber.

4. The valve according to claim 3, further comprising a third port perforating the second chamber and the housing.

5. The valve according to claim 1, further comprising;
a second chamber; and
a partition wall between the first chamber and the second chamber;
wherein the partition wall comprises an orifice such that the first chamber is in fluid communication with the second chamber.

6. The valve according to claim 1, wherein the guide member restricts movements of the armature to linear movement.

7. The valve according to claim 6, further comprising a partition wall;
wherein the guide member comprises a sleeve mounted to the partition wall; and
the guide member forms a slide bearing.

8. The valve according to claim 1, wherein:
the armature mechanically connects to the valve member; and
a linear movement of the armature causes a linear movement of the valve member.

9. The valve according to claim 1, wherein the armature and the valve member are arranged along one straight line.

10. A valve comprising:
a housing with a first chamber for a refrigerant;
a first port;
a second port;
a fluid path extending between the first port and the second port;
a valve member situated in the fluid path, the valve member selectively moveable between a closed position, blocking the fluid path, and an open position;
an armature coupled to and moving with the valve member and having a radially exterior surface;
a guide member forming a friction bearing for movement of the armature; and
a solenoid comprising a plurality of coils forming a linear actuator with the armature;
wherein at least a portion of the radially exterior surface of the armature directly faces the solenoid;
the solenoid is situated inside the first chamber; and
the armature has a first portion situated inside the first chamber; and
at least one of the plurality of coils and the first portion of the armature are directly exposed to any refrigerant in the first chamber.

* * * * *